(12) United States Patent  
Park

(10) Patent No.: US 12,301,963 B2  
(45) Date of Patent: May 13, 2025

(54) CAMERA MODULE AND OPTICAL DEVICE

(71) Applicant: LG INNOTEK CO., LTD., Seoul (KR)

(72) Inventor: Jae Keun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 105 days.

(21) Appl. No.: 17/925,418

(22) PCT Filed: May 24, 2021

(86) PCT No.: PCT/KR2021/006468  
§ 371 (c)(1),  
(2) Date: Nov. 15, 2022

(87) PCT Pub. No.: WO2021/256712  
PCT Pub. Date: Dec. 23, 2021

(65) Prior Publication Data  
US 2023/0199284 A1   Jun. 22, 2023

(30) Foreign Application Priority Data  
Jun. 17, 2020   (KR) .................. 10-2020-0073653

(51) Int. Cl.  
*H04N 23/51* (2023.01)  
*H04N 23/55* (2023.01)

(52) U.S. Cl.  
CPC ............. *H04N 23/51* (2023.01); *H04N 23/55* (2023.01)

(58) Field of Classification Search  
CPC ........ H04N 23/51; H04N 23/55; H04N 23/54; H04N 23/57; H04N 5/2257; G02B 13/001–009; G02B 7/04–105; H04M 1/0264; H01L 27/14618  
USPC ..................................... 348/207.99  
See application file for complete search history.

(56) References Cited

U.S. PATENT DOCUMENTS

| | | | |
|---|---|---|---|
| 2007/0146534 A1* | 6/2007 | Kim ........................ | H04N 23/55 348/340 |
| 2007/0241273 A1* | 10/2007 | Kim ........................ | H04N 23/54 250/239 |
| 2007/0253697 A1* | 11/2007 | Kim ........................ | G03B 3/00 348/E5.026 |
| 2010/0141825 A1* | 6/2010 | Kim .................. | H01L 27/14618 156/305 |

(Continued)

FOREIGN PATENT DOCUMENTS

| KR | 10-2008-0005733 A | 1/2008 |
|---|---|---|
| KR | 10-2010-0033574 A | 3/2010 |

(Continued)

*Primary Examiner* — Lin Ye  
*Assistant Examiner* — Chan T Nguyen  
(74) *Attorney, Agent, or Firm* — Birch, Stewart, Kolasch & Birch, LLP

(57) ABSTRACT

The present embodiment relates to a camera module comprising: a first substrate; a second substrate spaced from the first substrate in the optical axis direction on the first substrate; an image sensor electrically connected to the second substrate; a housing arranged on the second substrate; and a passive element arranged between the first substrate and the second substrate, wherein the passive element is arranged at a position lower than that of the lower end of the housing.

20 Claims, 3 Drawing Sheets

(56) References Cited

U.S. PATENT DOCUMENTS

2017/0294407 A1    10/2017  Kim et al.
2021/0167105 A1*   6/2021   Wang ................ H01L 27/14683

FOREIGN PATENT DOCUMENTS

KR    10-2012-0007728 A    1/2012
KR    10-2017-0114832 A    10/2017

* cited by examiner

CAMERA MODULE AND OPTICAL DEVICE

CROSS REFERENCE TO RELATED APPLICATIONS

This application is the National Phase of PCT/KR2021/006468 filed on May 24, 2021, which claims priority under 35 U.S.C. § 119(a) to Patent Application No. 10-2020-0073653 filed in the Republic of Korea on Jun. 17, 2020, all of which are hereby expressly incorporated by reference into the present application.

TECHNICAL FIELD

The present embodiment relates to a camera module and an optical device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, optical image stabilization (OIS) function for correcting a user's hand tremble during photographing is applied to a recent camera module. In addition, the size of the image sensor and the aperture of the lens are increasing as the function of the portable terminal is strengthened and the number of pixels is increased.

However, in a conventional camera module, the size of the image sensor increases as the number of pixels increases, and as a multilayer ceramic capacitor (MLCC) being electrically connected to the image sensor is disposed above the second substrate of a chip size package (CSP), the back focal length (BFL) of the lens is increased, thereby causing a problem of increasing the height of the camera module in the Z direction. BFL of a lens means the distance between the optical axes between the image sensor and the upper side surface of the lowermost lens among the plurality of lenses being disposed in the lens holder.

In addition, in a conventional camera module, when a multilayer ceramic capacitor (MLCC) which is a passive element is mounted in a first substrate of a chip size package (CSP), since it is disposed on an outer side of the solder ball to avoid the solder ball between the first and second substrates, there is a problem in that the size of the camera module in the X and Y directions increases.

DETAILED DESCRIPTION OF THE INVENTION

Technical Subject

The present embodiment is intended to provide a camera module comprising a chip size package (CSP) in which a passive element is disposed below the second substrate.

Technical Solution

A camera module according to the present embodiment comprises: a first substrate; a second substrate being spaced from the first substrate in an optical axis direction on the first substrate; an image sensor being electrically connected to the second substrate; a housing being disposed on the second substrate; and a passive element being disposed between the first substrate and the second substrate, wherein the passive element may be disposed at a position lower than that of the lower end of the housing.

It comprises a plurality of first conductive members being disposed between the first and second substrates and electrically connecting the first substrate and second substrate, wherein the passive element may be disposed between the plurality of first conductive members.

The first substrate comprises a first side and a second side being disposed at an opposite side from each other, and a third side and a fourth side connecting the first side and the second side and being disposed at an opposite side from each other, wherein the plurality of first conductive members comprises first to third unit conductive members being disposed between the first side of the first substrate and the image sensor, and wherein the passive element may comprise a first passive element being disposed between the first and second unit conductive members and a second passive element being disposed between the second and third unit conductive members.

It may comprise a second conductive member for electrically connecting an upper surface of the image sensor and a lower surface of the second substrate.

The passive element may be overlapped with the housing in an optical axis direction.

The passive element may be overlapped with the image sensor in a direction perpendicular to the optical axis direction.

The passive element may not be overlapped with the housing in a direction perpendicular to the optical axis direction.

The camera module may comprise: a lens holder being disposed in the housing; a lens being coupled to the lens holder; and a filter being disposed in the second substrate and being disposed between the lens and the image sensor.

The camera module may comprise a reinforcing plate being coupled to a lower surface of the first substrate.

A camera module according to the present embodiment comprises: a first substrate; a second substrate being spaced apart from the first substrate in an optical axis direction on the first substrate; an image sensor being electrically connected to the second substrate; a housing being disposed on the second substrate; a lens holder being disposed inside the housing; a lens being coupled to the lens holder and being disposed above the image sensor; and a passive element being disposed between the first substrate and the second substrate, wherein the passive element may be overlapped with the lens holder in an optical axis direction.

A camera module according to the present embodiment comprises: a first substrate; a second substrate being spaced apart from the first substrate in an optical axis direction; an image sensor being disposed in the first substrate; a housing being disposed on the second substrate; and a first adhesive member and a passive element being disposed on the first substrate, wherein the passive element may be disposed at a lower position than the second substrate.

The passive element and the first adhesive member may be disposed between the first substrate and the second substrate.

A space between the first substrate and the second substrate is comprised, and the passive element and the first adhesive member may be accommodated in the space.

The housing may be overlapped with the passive element in the optical axis direction.

The first adhesive member may be overlapped with the housing and the optical axis direction.

The first adhesive member may comprise a solder ball, the first adhesive member may comprise a plurality of adhesive members, and the passive element may be disposed between the plurality of adhesive members.

The first adhesive member may comprise a plurality of adhesive members, and the plurality of adhesive members may be disposed along an outer edge region of the first substrate.

The height of the first adhesive member in the optical axis direction may be higher than a height of the image sensor in the optical axis direction.

The second substrate comprises a first portion being overlapped with the passive element in the optical axis direction, and a second portion being extended from the first portion and not being overlapped with the passive element in the optical axis direction, wherein the second portion of the second substrate may be flip chip bonded to the image sensor.

The image sensor comprises an effective image area, and the second portion of the second substrate may not be overlapped with the effective image area of the image sensor in the optical axis direction.

The camera module according to the present embodiment comprises: a first substrate; a housing being disposed on the first substrate; an image sensor being disposed in the first substrate; a second substrate being disposed inside the housing; and a first adhesive member and a passive element disposed in the first substrate, wherein the passive element may be disposed below the second substrate.

The passive element and the first adhesive member may be disposed between the first substrate and the second substrate.

The housing may not be overlapped with the passive element in an optical axis direction.

The first adhesive member may comprise a solder ball, the first adhesive member may comprise a plurality of adhesive members, and the passive element may be disposed between the plurality of adhesive members.

The optical device according to the present embodiment may comprise the camera module.

Advantageous Effects

Through the present embodiment, it is possible to provide a camera module comprising a chip size package (CSP) in which a passive element is disposed below the second substrate.

In addition, by disposing a passive element being disposed at an upper portion of the second substrate of the conventional CSP below the second substrate, it is possible to minimize the BFL of the lens, and through this, the height of the camera module in the z direction can be minimized.

In addition, by disposing the conventional passive element being disposed at an outer side of the solder ball below the second substrate, the size of the camera module in the x-direction and the y-direction can be minimized.

BEST MODE

Figure 1:
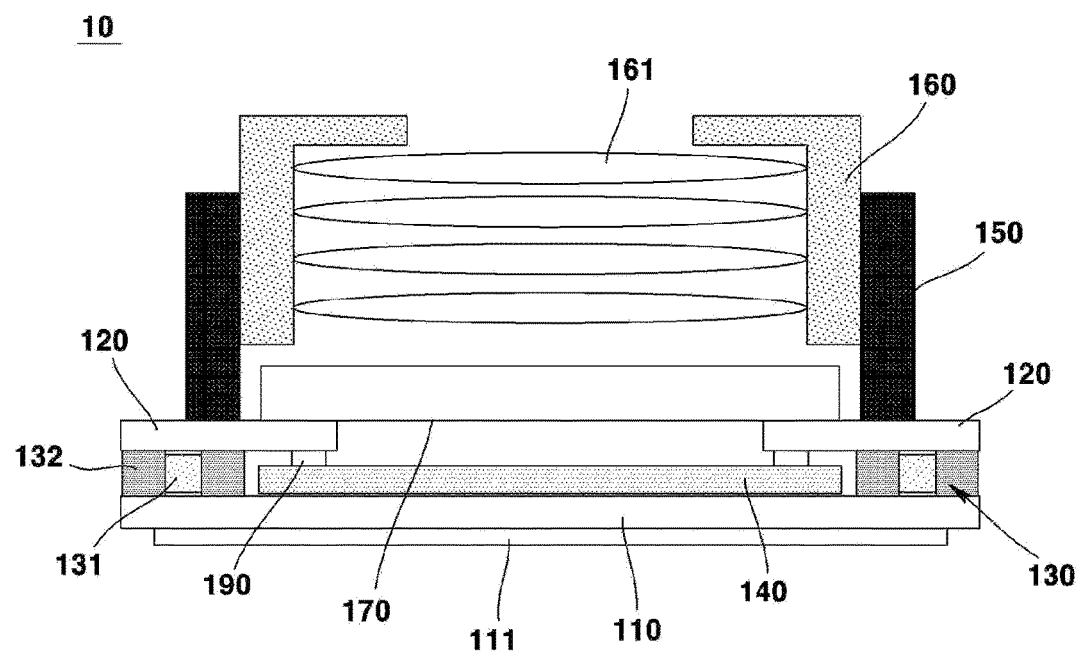
FIG. 1 is a cross-sectional view of a camera module according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

Hereinafter, the configuration of the camera module according to the present embodiment will be described with reference to the drawings.

Figure 2:
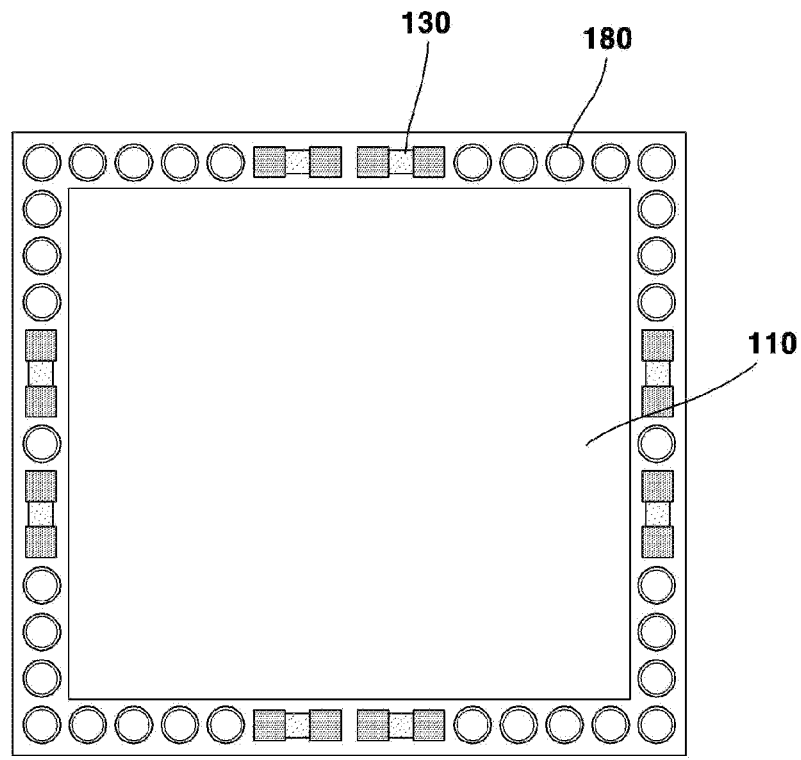
FIG. 2 is a bottom view of a camera module according to the present embodiment.
Figure 3:
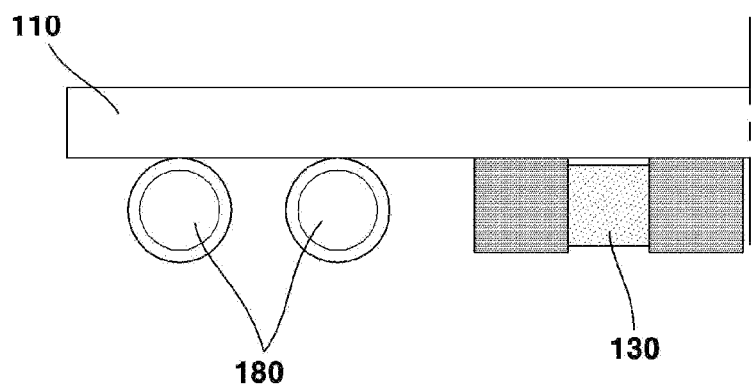
FIG. 3 is a side view of some configurations of a camera module according to the present embodiment.

FIG. 1 is a cross-sectional view of a camera module according to the present embodiment; FIG. 2 is a bottom view of a camera module according to the present embodiment; and FIG. 3 is a side view of some configurations of a camera module according to the present embodiment.

The camera module 10 may comprise a first substrate 110. The first substrate 110 may be a printed circuit board (PCB). The first substrate 110 may be a flexible printed circuit board (FPCB). An image sensor 140 may be disposed in the first substrate 110. The image sensor 140 may be mounted on an upper surface of the first substrate 110. The length of the first substrate 110 in a direction perpendicular to the optical axis direction may be longer than the length of the image sensor 140 in a corresponding direction. A reinforcing plate 111 may be disposed in the first substrate 110. A reinforcing plate 111 may be disposed on a lower surface of the first substrate 110. A first adhesive member 180 may be disposed in the first substrate 110. A first adhesive member 180 may be disposed on an upper surface of the first substrate 110. A passive element 130 may be disposed in the first substrate 110. A passive element 130 may be disposed on an upper surface of the first substrate 110. The outer edge of the first substrate 110 may be disposed at a position corresponding to the outer edge of the second substrate 120 in an optical axis direction.

The first substrate 110 may comprise a reinforcing plate 111. The reinforcing plate 111 may be disposed below the first substrate 110. The reinforcing plate 111 may be disposed on a lower surface of the first substrate 110. The reinforcing plate 111 may be coupled to a lower surface of the first substrate 110. The reinforcing plate 111 may comprise a metal material. The reinforcing plate 111 may support the thin and flexible first substrate 110 so as not to be deformed.

The camera module 10 may comprise a second substrate 120. The second substrate 120 may comprise a printed circuit board (PCB). The second substrate 120 may comprise a rigid printed circuit board. The second substrate 120 may be spaced apart from the first substrate 110 in an optical axis direction. The second substrate 120 may be overlapped with at least a portion of the first substrate 110 in an optical axis direction. The second substrate 120 may be disposed closer to the outer edge region of the first substrate 110 than to the central region of the first substrate 110. The first substrate 110 may be spaced apart from the image sensor 140 in an optical axis direction. At least a portion of the second substrate 120 may be overlapped with the image sensor 140 in an optical axis direction. The second substrate 120 may be overlapped with an outer edge region of the image sensor 140 in an optical axis direction. The second substrate 120 may be disposed to avoid the light receiving part of the image sensor 140. The second substrate 120 may not be overlapped with the light receiving part of the image sensor 140 in an optical axis direction. The second substrate 120 may be disposed on the first substrate 110. The second substrate 120 may be disposed above the first substrate 110.

The second substrate 120 may comprise a first portion being overlapped with the passive element 130 in an optical axis direction, and a second portion being extended from the first portion and not being overlapped with the passive element 130 in an optical axis direction. At least a portion of the first portion of the second substrate 120 may be overlapped with the housing 150 in an optical axis direction. At least a portion of the first portion may be more protruded outward than the housing 150. The second portion of the second substrate 120 may be flip chip bonded to the image sensor 110. The second portion of the second substrate 120 may not be overlapped with the housing 150 in an optical axis direction. The second portion of the second substrate 120 may be overlapped with the lens holder 160 in an optical axis direction. The second portion of the second substrate 120 may be overlapped with the filter 170 in an optical axis direction. The second portion of the second substrate 120 may not be overlapped with the effective image area of the image sensor 140 in an optical axis direction. The second portion of the second substrate 120 may be protruded inward than the housing 150.

A first adhesive member 180 may be disposed in the second substrate 120 A first adhesive member 180 may be disposed on a lower surface of the second substrate 120. The first adhesive member 180 may be attached to a lower surface of the second substrate 120. At least a portion of the second substrate 120 may be disposed above the image sensor 140. A second adhesive member 190 may be disposed in the second substrate 120. A second adhesive member 190 may be disposed on a lower surface of the second substrate 120. A second adhesive member 190 may be disposed between the second substrate 120 and the image sensor 140. A passive element 130 may be disposed in the second substrate 120. A passive element 130 may be disposed on a lower surface of the second substrate 120. A passive element 130 may be disposed on the lower surface of the second substrate 120. The passive element 130 may be fixed to a lower surface of the second substrate 120.

The first adhesive member 180 may be a first conductive member. The first conductive member may electrically connect the first substrate 110 and the second substrate 120. The first conductive member may contain solder. The first conductive member may comprise a conductive epoxy. The second adhesive member 190 may be a second conductive member. The second conductive member may electrically connect the second substrate 120 and the image sensor 140. The second conductive member may comprise solder. The second conductive member may comprise a conductive epoxy.

A housing 150 may be disposed in the second substrate 120. The housing 150 may be coupled to the second substrate 120. A housing 150 may be disposed on an upper surface of the second substrate 120. The housing 150 may be disposed on an upper surface of the second substrate 120. A filter 170 may be disposed in the second substrate 120. A filter 170 may be disposed on an upper surface of the second substrate 120. A filter 170 may be disposed on an upper surface of the second substrate 120.

The camera module 10 may comprise a passive element 130. The passive element 130 may comprise a multilayer ceramic capacitor (MLCC). The passive element 130 may comprise a multilayer ceramic capacitor (MLCC). The passive element 130 may be electrically connected to the image sensor 140. The passive element 130 may be disposed in the first substrate 110. The passive element 130 may be disposed on an upper surface of the first substrate 110. The passive element 130 may be disposed in an outer edge region of the first substrate 110. The passive element 130 may be disposed in the second substrate 120. The passive element 130 may be disposed on a lower surface of the second substrate 120. The passive element 130 may be disposed between the first substrate 110 and the second substrate 120. The passive element 130 may be disposed more outward than the image sensor 140 on the first substrate 110. The passive element 130 may be accommodated in a space between the first substrate 110 and the second substrate 120.

The passive element 130 may comprise a device portion 131 and a solder 132 coupled to the device portion 131. The solder 132 may comprise a plurality of solders 132. The solder 132 may comprise two solders 132. The solder 132 may be coupled to both sides of the device unit 131. The solder 132 may be fixed by being in contact with an upper surface of the first substrate 110. The solder 132 may fix the device portion 131 to the first substrate 110. The solder 132 may be in contact with a lower surface of the second substrate 120. The solder 132 may fix the device portion 131 to the second substrate 120.

The passive element 130 may be overlapped with the housing 150 in an optical axis direction. The solder portion of the passive element 130 may be overlapped with the housing 150 in an optical axis direction. At least a portion of the device portion 131 of the passive element 130 may be overlapped with the housing 150 in an optical axis direction. Through this, the housing 150, the second substrate 120, the passive element 130, and the first substrate 110 may serve as one pillar. That is, it can withstand external impact. Furthermore, it is possible to minimize the tilt of the camera module 10 due to the rigid passive element.

The passive element 130 may be disposed between the plurality of first adhesive members 180. In a conventional camera module, the passive element 130 is disposed at an upper portion of the second substrate 120, and only solder balls are disposed between the first substrate 110 and the second substrate 120. However, the passive element 130 of the camera module 10 according to the present embodiment is disposed below the second substrate 120. To this end, a part of the first adhesive member 180 being disposed between the first substrate 110 and the second substrate 120 is replaced with the passive element 130 so that the passive element 130 can be disposed between a plurality of first adhesive members 180. Through this, the height of the camera module 10 in the z-axis direction can be minimized. In addition, the size of the camera module 10 in the x-axis and y-axis directions can be minimized.

The height of the passive element 130 in an optical axis direction may be greater than the height of the image sensor 140 in the optical axis direction. When the height of the passive element 130 in an optical axis direction is too low, the space in which the image sensor 140 is disposed may become narrow. In addition, if the height of the passive element 130 in an optical axis direction is too high, the overall height of the camera module 10 may increase when the housing 150 is disposed on the second substrate 120 being attached to the passive element 130. Therefore, the height of the passive element 130 may be formed to maintain a minimum height of the camera module 10 while securing a space in which the image sensor 140 may be disposed.

The first substrate 110 may comprise a first side and a second side being disposed opposite to each other, and a third side and a fourth side connecting the first side and the second side and being disposed opposite to each other. The plurality of first conductive members may comprise first to third unit conductive members being disposed between the first side of the first substrate 110 and the image sensor 140. The passive element 130 may comprise a first passive element being disposed between the first and second unit conductive members and a second passive element being disposed between the second and third unit conductive members. The passive element 130 may be disposed between the image sensor 140 and the first side of the first substrate 110. The passive element 130 may be disposed between the image sensor 140 and the second side of the first substrate 110. The passive element 130 may be disposed between the image sensor 140 and the third side of the first substrate 110. The passive element 130 may be disposed between the image sensor 140 and the fourth side of the first substrate 110.

The camera module 10 may comprise an image sensor 140. The image sensor 140 may have a configuration in which light passing through the lens 161 and the filter 170 is incident to form an image. The image sensor 140 may be mounted on the first substrate 110. The image sensor 140 may be electrically connected to the first substrate 110. For example, the image sensor 140 may be coupled to the first substrate 110 by a surface mounting technology (SMT). As another example, the image sensor 140 may be coupled to the first substrate 110 by a flip chip technology. The image sensor 140 may be disposed such that the lens 161 and the optical axis coincide. That is, the optical axis of the image sensor 140 and the optical axis of the lens 161 may be aligned. The image sensor 140 may convert light irradiated to the effective image area of the image sensor 140 into an electrical signal. The image sensor 140 may be any one among a charge coupled device (CCD), a metal oxide semi-conductor (MOS), a CPD, and a CID. The image sensor 140 may be electrically connected to the passive element 130.

The image sensor 140 may be disposed below the second substrate 120. The image sensor 140 may be coupled to the second substrate 120. The image sensor 140 may be coupled to the second substrate 120 by a flip chip technology. The image sensor 140 may be spaced apart from the second substrate 120 in an optical axis direction. The image sensor 140 may be overlapped with at least a portion of the second substrate 120 in an optical axis direction. The effective image area of the image sensor 140 may not be overlapped with the second substrate 120 in an optical axis direction. The image sensor 140 may be disposed on the first substrate 110. The image sensor 140 may be disposed in the second substrate 120. The image sensor 140 may be electrically connected to the second substrate 120. The image sensor 140 may be disposed between the first substrate 110 and the second substrate 120.

The camera module 10 may comprise a housing 150. The housing 150 may be disposed in the second substrate 120. The housing 150 may be coupled to an upper surface of the second substrate 120. The housing 150 may be spaced apart from the first substrate 110 in an optical axis direction. The housing 150 may be overlapped with the light receiving element in an optical axis direction. The housing 150 may be overlapped with the first adhesive member 180 in an optical axis direction. Through this, the housing 150, the second substrate 120, the passive element 130, and the first substrate 110 may serve as one pillar. That is, it can withstand external impact. The housing 150 may be a cover member. The housing 150 may be a cover can. The housing 150 may be a shield member. The housing 150 may be a shield can.

A lens holder 160 may be disposed inside the housing 150. At least a portion of the lens holder 160 may be disposed inside the housing 150. The housing 150 may be coupled to the lens holder 160. The housing 150 may be screw-coupled to the lens holder 160. In this case, the inner circumferential surface of the housing 150 may comprise a screw thread shape. As a modified embodiment, the housing 150 may be thread-free coupled to the lens holder 160. In this case, the inner circumferential surface of the housing 150 may not comprise a screw thread. A filter 170 may be disposed inside the housing 150.

The camera module 10 may comprise a lens holder 160. The lens holder 160 may be a lens barrel. The lens holder 160 may be disposed inside the housing 150. At least a portion of the lens holder 160 may be disposed inside the housing 150. The lens holder 160 may be coupled to the housing 150. The lens holder 160 may be screw-coupled to the housing 150. In this case, the outer circumferential surface of the lens holder 160 may comprise a screw thread shape. As a modified embodiment, the lens holder 160 may be coupled to the housing 150. In this case, the outer circumferential surface of the lens holder 160 may not comprise a screw thread. The lens holder 160 may accommodate the lens therein. The lens holder 160 may have a plurality of lenses 161 disposed therein. The lens 161 may be disposed at a position corresponding to the image sensor 140.

The camera module 10 may comprise a filter 170. The filter 170 may serve to block light in a specific frequency band from being incident on the image sensor 140 in light passing through the lens 161. The filter 170 may be disposed to be parallel to the x-y plane. The filter 170 may be disposed between the lens 161 and the image sensor 140. The filter 170 may comprise an infrared filter. The infrared filter may block light in the infrared region from being incident on the image sensor 140. The filter 170 may be disposed in the second substrate 120. The filter 170 may be coupled to an upper surface of the second substrate 120.

The camera module 10 may comprise a first adhesive member 180. The first adhesive member 180 may have conductivity. The first adhesive member 180 may comprise a conductive member having conductivity. The first adhesive member 180 may be disposed in the first substrate 110. The first adhesive member 180 may be disposed on the first substrate 110. The first adhesive member 180 may be disposed on an upper surface of the first substrate 110. The first adhesive member 180 may be attached to an upper surface of the first substrate 110. The first adhesive member 180 may comprise a plurality of first adhesive members 180. The plurality of first adhesive members 180 may be spaced apart from one another. The first adhesive member 180 may be disposed on an outer edge region of the first substrate 110. The first adhesive member 180 may be disposed more outward than the image sensor 140 on the first substrate 110. A passive element 130 may be disposed between the plurality of first adhesive members 180. The first adhesive member 180 may be disposed along an outer edge of the first substrate 110.

The first adhesive member 180 may be disposed in the second substrate 120. The first adhesive member 180 may be disposed on a lower surface of the second substrate 120. The first adhesive member 180 may be attached to a lower surface of the second substrate 120. The first adhesive member 180 may be disposed between the first substrate 110 and the second substrate 120. The first adhesive member 180 may separate the first substrate 110 and the second substrate 120 from each other. The first adhesive member 180 may separate the first substrate 110 and the second substrate 120 apart from each other in an optical axis direction. The height of the first adhesive member 180 in an optical axis direction may be greater than the height of the image sensor 140 in an optical axis direction. If the height of the first adhesive member 180 in an optical axis direction is too low, the space in which the image sensor 140 is disposed may become narrow. In addition, if the height of the first adhesive member 180 in an optical axis direction is too high, the overall height of the camera module 10 may be increased. Accordingly, the height of the first adhesive member 180 may be formed to a height capable of maintaining a minimum height of the camera module 10 while securing a space in which the image sensor 140 can be disposed. The first adhesive member 180 may be accommodated in a space between the first substrate 110 and the second substrate 120.

The first adhesive member 180 may be overlapped with the housing 150 in an optical axis direction. The first adhesive member 180 may be overlapped with at least a portion of the housing 150 in an optical axis direction. Through this, the first adhesive member 180 may comprise solder. The first adhesive member 180 may comprise a solder ball.

The camera module 10 may comprise a second adhesive member 190. The second adhesive member 190 may be conductive. The second adhesive member 190 may comprise a conductive member having conductivity. The second adhesive member 190 may be a flip chip bonding. The second adhesive member 190 may be disposed on a lower surface of the second substrate 120. The second adhesive member 190 may be disposed on an upper surface of the image sensor 140. The second adhesive member 190 may be disposed between the image sensor 140 and the second substrate 120. The second adhesive member 190 may fix the image sensor 140 and the second substrate 120.

The camera module may comprise a third adhesive member (not shown). The third adhesive member may comprise a side fill. The third adhesive member may be disposed between the first substrate 110 and the second substrate 120. The third adhesive member may be disposed adjacent to the outer side surfaces of the first substrate 110 and the second substrate 120. The third adhesive member may be disposed outside the passive element 130. The third adhesive member may be disposed outside the first adhesive member 180. Through this, the open region between the first substrate 110 and the second substrate 120 may be sealed. Through this, it is possible to prevent foreign substances from entering into the gap between the first substrate 110, the second substrate 120, the first adhesive member 180, and the passive element 130.

In a camera module 10 according to the present embodiment, components such as an active element and a driver IC in addition to the passive element 130 may be mounted between the first substrate 110 and the second substrate 120.

Hereinafter, a configuration of the camera module according to a modified embodiment will be described with reference to the drawings. The camera module 20 according to a modified embodiment may be configured the same except for the coupling position of the camera module 20 and the housing 150 according to the present embodiment. Hereinafter, for the camera module 20 according to the modified embodiment, descriptions of the same configuration as the camera module 10 according to the present embodiment may be omitted.

Figure 4:
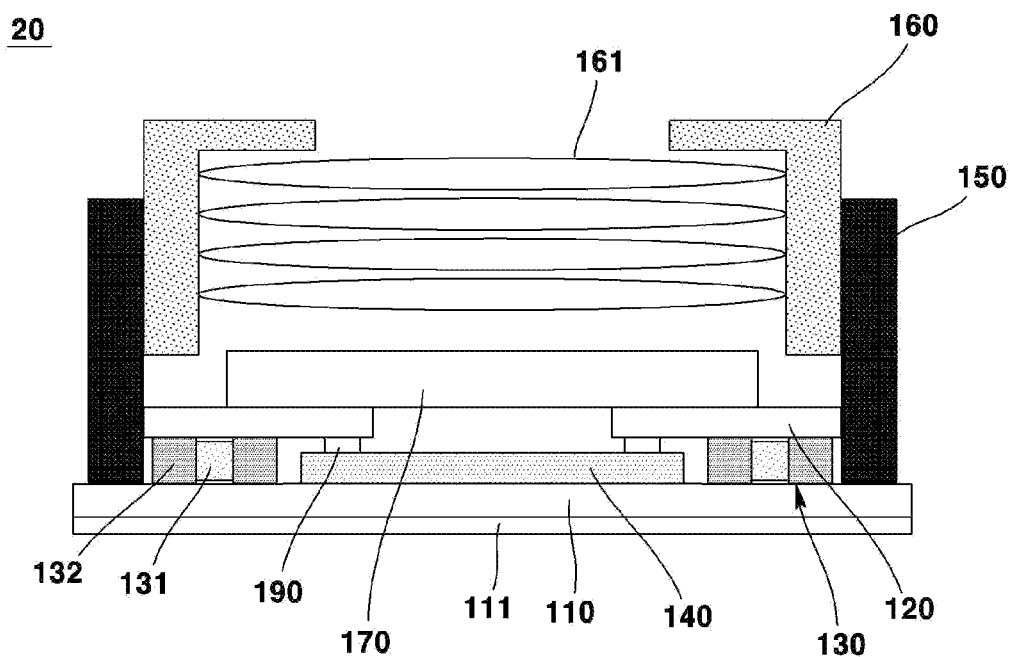
FIG. 4 is a cross-sectional view of a camera module according to a modified embodiment of the present embodiment.

FIG. 4 is a cross-sectional view of a camera module according to a modified embodiment of the present embodiment.

A camera module 20 according to the modified embodiment may comprise a housing 150. The housing 150 may be coupled to the first substrate 110. In this case, the third adhesive member may be omitted. The housing 150 may be disposed on an outer side surface of the second substrate 120. The housing 150 may not be overlapped with the passive element 130 in an optical axis direction. The housing 150 may not be overlapped with the first adhesive member 180 in an optical axis direction. The housing 150 may be disposed outside the first adhesive member 180. The housing 150 may be disposed outside the passive element 130. The housing 150 may be disposed outside the second substrate 120. In this case, the second substrate 120 may be disposed inside the housing 150. The first adhesive member 180 may be disposed inside the housing 150. The passive element 130 may be disposed inside the housing 150.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera module comprising:
a first substrate;
a second substrate disposed on the first substrate and spaced from the first substrate in an optical axis direction;
an image sensor electrically connected with the second substrate;
a housing disposed on the second substrate;
a passive element disposed between the first substrate and the second substrate; and
a plurality of first conductive members disposed between the first substrate and the second substrate and electrically connecting the first substrate and the second substrate,
wherein the passive element is disposed lower than a lower end of the housing,
wherein the first substrate comprises a first side and a second side disposed to be opposite to each other, and a third side and a fourth side connecting the first side and the second side and disposed to be opposite to each other,
wherein the plurality of first conductive members comprises first to third unit conductive members disposed between the first side of the first substrate and the image sensor, and
wherein the passive element comprises a first passive element disposed between the first and second unit conductive members and a second passive element disposed between the second and third unit conductive members.

2. The camera module of claim 1, wherein the passive element is disposed between the plurality of first conductive members.

3. The camera module of claim 1, further comprising a second conductive member electrically connecting an upper surface of the image sensor and a lower surface of the second substrate.

4. The camera module of claim 3, wherein the passive element is overlapped with the housing in the optical axis direction.

5. The camera module of claim 1, wherein the passive element is overlapped with the image sensor in a direction perpendicular to the optical axis direction.

6. The camera module of claim 1, wherein the passive element is not overlapped with the housing in a direction perpendicular to the optical axis direction.

7. The camera module of claim 1, further comprising:
a lens holder disposed in the housing;
a lens coupled to the lens holder; and
a filter disposed on the second substrate and disposed between the lens and the image sensor.

8. The camera module of claim 7, wherein the filter is not overlapped with the passive element in the optical axis direction.

9. The camera module of claim 7, wherein the filter is overlapped with the housing in a direction perpendicular to the optical axis direction.

10. The camera module of claim 7, wherein the lens comprises a plurality of lenses comprising an upmost lens, and
wherein the upmost lens is disposed higher than an upper end of the housing.

11. The camera module of claim 1, further comprising a reinforcing plate coupled to a lower surface of the first substrate.

12. The camera module of claim 1, wherein, in the optical axis direction, a thickness of the passive element is greater than a thickness of the image sensor.

13. The camera module of claim 1, wherein the passive element and the first conductive member are disposed along with an edge of an upper surface of the first substrate.

14. The camera module of claim 1, wherein the first passive element and the second passive element are opposite to each other about the image sensor, and
wherein, in a direction perpendicular to the optical axis direction, the image sensor is disposed between the first passive element and the second passive element.

15. An optical device comprising the camera module of claim 1.

16. The camera module of claim 1, further comprising a filter disposed on the second substrate,
wherein the second substrate comprises a hole disposed between the filter and the image sensor.

17. A camera module comprising:
a first substrate;
a second substrate spaced apart from the first substrate in an optical axis direction;
an image sensor electrically connected with the second substrate;
a housing disposed on the second substrate;
a lens holder disposed in the housing;
a lens coupled to the lens holder and disposed on the image sensor;
a passive element disposed between the first substrate and the second substrate; and
a plurality of first conductive members disposed between the first substrate and the second substrate and electrically connecting the first substrate and the second substrate,
wherein the passive element is overlapped with the housing in the optical axis direction,
wherein the first substrate comprises a first side and a second side disposed to be opposite to each other, and a third side and a fourth side connecting the first side and the second side and disposed to be opposite to each other,
wherein the plurality of first conductive members comprises first to third unit conductive members disposed between the first side of the first substrate and the image sensor, and
wherein the passive element comprises a first passive element disposed between the first and second unit conductive members and a second passive element disposed between the second and third unit conductive members.

18. The camera module of claim 17, wherein the passive element is not overlapped with the housing in a direction perpendicular to the optical axis direction.

19. The camera module of claim 17, wherein the image sensor is not overlapped with the housing in a direction perpendicular to the optical axis direction.

20. A camera module comprising:
a first substrate;
a second substrate disposed on the first substrate and spaced from the first substrate in an optical axis direction;
an image sensor electrically connected with the second substrate;
a lens holder disposed on the second substrate;
a passive element disposed between the first substrate and the second substrate; and
a plurality of first conductive members disposed between the first substrate and the second substrate and electrically connecting the first substrate and the second substrate,
wherein the first substrate comprises a first side and a second side disposed to be opposite to each other, and a third side and a fourth side connecting the first side and the second side and disposed to be opposite to each other,
wherein the plurality of first conductive members comprises first to third unit conductive members disposed between the first side of the first substrate and the image sensor, and
wherein the passive element comprises a first passive element disposed between the first and second unit conductive members and a second passive element disposed between the second and third unit conductive members.

* * * * *